United States Patent
Nordhoff

(10) Patent No.: US 7,073,603 B2
(45) Date of Patent: Jul. 11, 2006

(54) DEVICE FOR COUPLING TWO UNITS TO EACH OTHER

(75) Inventor: Hendrik Nordhoff, Havixbeck (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/514,077

(22) PCT Filed: May 12, 2003

(86) PCT No.: PCT/EP03/04955

§ 371 (c)(1),
(2), (4) Date: May 19, 2005

(87) PCT Pub. No.: WO03/094591

PCT Pub. Date: Nov. 20, 2003

(65) Prior Publication Data

US 2005/0208262 A1    Sep. 22, 2005

(30) Foreign Application Priority Data

May 11, 2002  (DE) ............................ 202 20 427 U

(51) Int. Cl.
- *A01B 51/00* (2006.01)
- *A01B 59/043* (2006.01)
- *A01B 59/06* (2006.01)
- *A01B 63/02* (2006.01)
- *A01B 63/118* (2006.01)

(52) U.S. Cl. ...................... 172/272; 172/439; 172/680; 37/231

(58) Field of Classification Search ........ 172/439–451, 172/677–680, 272–275; 280/186; 37/231, 37/417, 435
See application file for complete search history.

(56) References Cited

U.S. PATENT DOCUMENTS

| 3,432,184 A | * | 3/1969 | Tweedy ...................... 172/272 |
| 6,321,851 B1 | * | 11/2001 | Weiss et al. ................ 172/444 |
| 2001/0022226 A1 | * | 9/2001 | Staude ........................ 172/439 |

FOREIGN PATENT DOCUMENTS

| DE | 36 07 257 | 9/1987 |
| DE | 44 37 587 | 5/1995 |
| FR | 2 671 450 | 7/1992 |

* cited by examiner

*Primary Examiner*—Christopher J. Novosad

(57) ABSTRACT

A device for coupling two units to each other with at least five connecting elements (18,20,22,24,26) whereby the respective first end thereof can be hingeably connected to respectively one connection point (30,32,34,36,38) of one unit and whose other end can be hingeably connected to a respective connection point (40,42,44,46,48) of the other unit. One length-adjustable connecting element (18) is exclusively provided, the element being arranged in a substantially central position in the upper area of the device (12). Two connecting elements (24,26) are provided in the lower area of the device (12). Two length-adjustable connectable elements (20,22) are coupled substantially at the connection point (36;38) of a connecting element (24,26) arranged in the lower area of the device (12) on one unit, and in a lower area (42,4') of the other unit. A length-adjustable stabilizer element (28) is also provided. The element cooperates, with at least one of the two connecting elements (24,26) arranged in the lower area, with at least one connection point (38,46;36,48) and/or with at least one unit.

26 Claims, 9 Drawing Sheets

Fig.1

DEVICE FOR COUPLING TWO UNITS TO EACH OTHER

Figure 1:
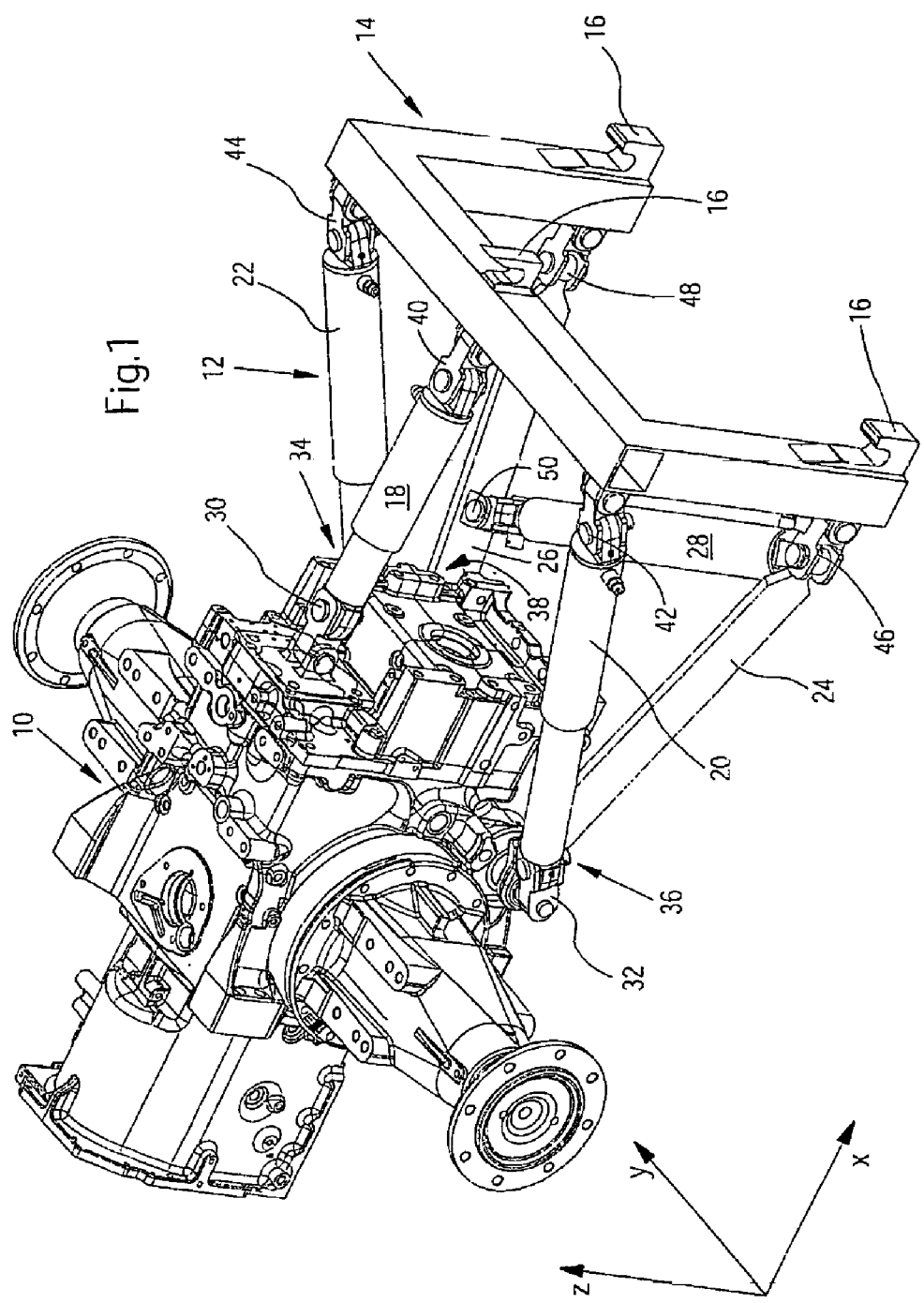

The invention relates to a device for coupling two units to each other, especially a work tool to a work vehicle. Such coupling devices are used for example to couple a work tool to a farm or industrial utility vehicle. In particular a work tool designed in the form of a plow is coupled to a work vehicle designed in the form of a tractor.

Various attachment interfaces—also referred to as tool coupling devices—are known, with which a farm work tool can be attached to a farm utility vehicle. Such a tool coupling system is for example a three-point tool hitch, as has been defined by the German Standard ISO 730 or DIN 9674. With such a conventional coupling device, however, only a limited number of degrees of freedom of motion is possible between the work vehicle and the work tool—i.e. between the two units. For example the three-point tool hitch defined in the German Standard ISO 730 or DIN 9674 enables hardly any rotation of the work vehicle and the work tool in relation to one another about the connection longitudinal axis or about the vehicle longitudinal axis since for this at least the lifting struts would have to be selected accordingly.

The equipment coupling system known from the article "Mechatronics in the Field of Mobile Hydraulics (Mechatronik in der Mobilhydraulik)" published in the magazine Landtechnik (agricultural technology), 3/2002, Vol. 57, pages 140 and 141 represents an improvement of a conventional three-point tool hitch in which the lifting struts and the upper link are formed by length-adjustable connecting elements. In this example a rotation of the work vehicle and the work tool in relation to each other about the connection longitudinal axis or about the vehicle longitudinal axis is only possible when the two length-adjustable lift cylinders provided there are selected accordingly. Yet even if this should be the case, load transmission between the work vehicle and the work tool is possible only to a limited extent especially when traveling in curves since the traction struts have to absorb bending moments and the equipment coupling is designed to do so only to a limited extent.

It is the object of the invention to provide and further design a device for coupling two units of the above-mentioned kind to each other such that the aforementioned problems are overcome. In particular, the arrangement of the connecting elements between the two units are supposed to enable torsion of the one unit—designed in the form of a work vehicle—and the other unit—designed in the form of a work tool—in relation to each other about the connection longitudinal axis or about the vehicle longitudinal axis, wherein improved load transmission shall be possible, especially when traveling in curves.

The object is achieved pursuant to the invention through the idea of patent claim 1. Further beneficial designs and developments of the invention are revealed in the dependent claims.

Pursuant to the invention, a device for coupling two units of the above-mentioned kind to each other comprises at least five connecting elements, whereby the respective first ends thereof are hingeably connected to a connection point of the one unit and the respective other ends thereof are hingeably connected to a connection point of the other unit, wherein for the purpose of performing tilting motions between the two units only one length-adjustable connecting element that is arranged in a substantially central position in the upper area of the device is provided, wherein for the transmission of towing or pushing forces between the two units two connecting elements that are arranged in the lower area of the device are provided, wherein for the purpose of performing lifting motions between the two units two length-adjustable connecting elements are provided, which on one hand are linked substantially in a connection point of a connecting element that is arranged in the lower area of the device on the one unit and on the other hand in an upper area of the other unit, and wherein for the purpose of controlling oscillating motions between the two units a length-adjustable stabilizer element is provided, which cooperates with at least one of the two connecting elements arranged in the lower area, with at least one connection point and/or with at least one unit.

In principle the connection points, to which the connecting elements can be attached, can be assigned to one unit or the two units. An assignment of the connection points to the coupling device pursuant to the invention would likewise be feasible. For example a frame that is assigned to a unit could be provided, which can be adapted to said unit and which comprises the connection points assigned to said unit—for example in the form of universal joints.

Tilting motions in the sense of the present invention are above all movements, which occur in the operating position about a substantially horizontally arranged axis, which is arranged substantially vertical to the connection longitudinal axis. In particular the tilting axis is arranged in the area of the rear axle on the tractor or on the coupling device.

An oscillating motion in the sense of the present invention includes relative movements between the two units, which occur in the operating position in a substantially horizontally direction, as they occur for example with a configuration comprising a tractor and work tool when the configuration travels through a slalom course. Through the length-adjustable stabilizer element hence the degree of freedom of the oscillating motion can be created directly through its selection. Hence beneficially it is not necessary to provide and select several elements or actuators.

In general the length-adjustable stabilizer element can be linked with its one end directly to the one unit and engage with its other end on a connecting element arranged in the lower area of the device. Likewise it would conceivable to link the length-adjustable stabilizer element with its one end directly to one unit and with its other end directly to the other unit, wherein at least one end of the length-adjustable stabilizer element is connected in the direct vicinity of one end of a connecting element that is arranged in the lower area of the device. This way it can be realized that the length-adjustable stabilizer element cooperates with the connecting element that is arranged in the lower area of the device.

Improved load transmission in the case of units that are tilted about the connection longitudinal axis when traveling in curves can be achieved with the inventive arrangement of the connecting elements that serve the lifting motions. It is therefore provided that the connecting element serving the execution of lifting motions are hingeably arranged on one hand substantially in one connection point of a connecting element that is arranged in the lower area of the device on one unit and on the other hand in the upper area of the other unit. This means that the connection point arranged on the one unit of the connecting element serving the execution of the lifting motions engages in the direct vicinity of the connection point of the corresponding connecting element on this unit. Preferably also both connecting elements can engage in the same area in one point. Due to the inventive arrangement of the connecting elements serving the execution of lifting motions, even in the rotated state of the units during curve travel towing or pushing forces can be transmitted not only via the connecting elements arranged in the lower area of the device—which mainly serve the transmission of towing and pushing forces—, but also via the connecting devices serving the lifting motions since they connect one unit directly to the other.

It is therefore provided in a preferred embodiment that on one unit the connection point of the one end of a connecting element arranged in the lower area and the connection point of the other end of a connecting element provided for lifting motions are arranged on the same unit with slight spacing or are arranged in the same location.

In a preferred embodiment, the stabilizer element is linked with its one end on the one unit and with its other end on one of the two connecting elements that are arranged in the lower area of the device. This way an oscillating motion between the two units can be prevented because the length-adjustable stabilizer element is kept constant in its position. On the other hand an oscillating motion between the two units can be realized through a corresponding selection of the length-adjustable stabilizer element such that beneficially a specifiable or defined oscillating motion between the two units is enabled. Additionally no relative movements of the stabilizer element to the lower connecting elements arise when lifting tools on and off.

Efficient power transmission of the length-adjustable stabilizer element can beneficially be accomplished when the stabilizer element together with the two connecting elements that are arranged in the lower area of the device is arranged substantially in one plane. Hereby the force that is transferred or absorbed by the length-adjustable stabilizer element acts in the same plane in which the connecting elements that are arranged in the lower area of the device are located, which serve the absorption and/or transfer of towing and pushing forces.

In a preferred embodiment the stabilizer element is arranged together with the two connecting elements that are arranged in the lower area of the device such that the three elements form a closed kinematic chain. This is a parallel structured configuration, the theoretical principles of which are explained in "Kinematics and Robotics (Kinematik and Robotik)" by Manfred Husty, Adolf Karger, Hans Sachs, Waldemar Steinhilper, Springer-Verlag Berlin Heidelberg New York (1997), pages 491–524, ISBN 3-540-63181. A closed kinematic chain is a gearbox consisting of links (legs) and joints, in which the chain end points are linked to a common base body. In the present case the connecting elements represent the links of the kinematic chain, the connection points represent the joints. A closed kinematic chain is beneficial in particular with respect to the degrees of freedom that can be achieved with it.

In a particularly preferred embodiment, the stabilizer element is arranged with its one end slightly away from a connection point arranged on the one unit of an end of a connecting element that is arranged in the lower area. With its other end it is arranged slightly away from a connection point arranged on the other unit of an end of the other connecting element that is arranged in the lower area.

One or both ends of the stabilizer element can also be arranged in the same location of the connection points of one end of a connecting element that is arranged in the lower area. Hence on the one unit the one connection point of the stabilizer element is arranged in a co-localized fashion with the connection point of a connecting element that is arranged in the lower area, i.e. located in the same area. On the other unit then the other connection point of the stabilizer element can be arranged in a co-localized fashion with the connection point of the other connecting element that is arranged in the lower area. If the latter is likewise the case, then a concrete form of a closed kinematic chain consisting of the three elements is created. By arranging the ends of the stabilizer element in the direct vicinity of the connection points of the connecting elements that are arranged in the lower area, a change in the length of the stabilizer element acts almost directly upon the corresponding connection points of the connecting element arranged in the lower area. With a constant length of the stabilizer element, this arrangement can beneficially effectively prevent an oscillating motion since the stabilizer element as well as the connecting elements of the two units are directly connected with each other.

Furthermore at least one end of the stabilizer element can be linked directly to a connecting element that is arranged in the lower area, for example in its center.

Now, in general, the two connecting elements that are arranged in the lower area of the device and/or the connecting elements that are provided for the purpose of executing lifting motions can be arranged substantially parallel, convergent, V-shaped or crossed in relation to each other. Preferably a convergent arrangement of the connecting elements is provided, which is designed such as is generally the case for lower links of a three-point tool hitch. If the one unit is designed as a work vehicle and the other unit as a work tool, then it is preferably provided that the connection points of the two connecting elements that are arranged in the lower area of the device are spaced further from each other on the work tool side than on the vehicle side.

In a particularly preferred embodiment, an upper and two lower connection points are provided on the one unit, which form a triangle. Here the two connection points located on the bottom can be arranged on a substantially horizontally extending line. The connection points are preferably arranged on the tool side such that for example through the arrangement of the connection points a tool interface can be formed that corresponds to the German Standard ISO 730 or DIN 9674. This way a device pursuant to the invention is beneficially also compatible with conventional work tools.

Pursuant to another embodiment, on the one unit three top and two lower connection points are provided. The three connection points located on top are preferably arranged on a substantially horizontally extending line. The two connection points arranged on the bottom can be arranged on a substantially horizontally extending line. Such a configuration can be provided for example on the vehicle side, wherein in this case the connecting elements arranged on the vehicle side can be arranged in accordance with the German Standard ISO 730 or DIN 9674.

For efficient power transmission it is beneficial when the top connection points of the connecting elements serving the lifting motions are arranged on the one unit in a spaced fashion from the plane, which is formed by the other connection points that are assigned to the unit. In particular, arranging the connection points that are spaced from the plane between the two units results in an arrangement of the connecting elements serving the lifting motions that points nearly in the direction of the resulting lifting motion. This way the efficiency of the lifting motion to be performed can be beneficially improved.

In a very special preferred embodiment, the connection points assigned to a unit are not arranged directly, but indirectly on the unit. For example the connection points can be attached to a unit via a dismountable adaptation interface. The adaptation interface could comprise a coupling frame, which in turn comprises coupling devices for attaching a work tool. To this extent a modular design of the device is feasible so that it can beneficially be adapted to already existing interfaces of for example a tractor. In the end this way also compatibility between the device pursuant to the invention and a device coupling as described in the German Standard DIN 730 or DIN 9674 can be accomplished.

In a preferred embodiment the connection points assigned to one unit, respectively, are located substantially in a—preferably vertically arranged—plane. Such an arrangement enables for example the work tool to be lifted on and/or off, wherein only the length-adjustable connecting elements provided for executing the lifting motions must be actively selected. The other connecting elements can hereby remain unchanged in their length. Also a lateral oscillation between the two units is possible by selecting the stabilizer element or switching it into pressureless mode, wherein also here an additional length adjustment of the other connecting elements must beneficially not take place and therefore selection of the coupling device pursuant to the invention can be performed more easily.

The two connecting elements arranged in the lower area of the device can be designed in the usual fashion as rigid lower links. In a particularly preferred embodiment these connecting elements, however, are length-adjustable. This way for example the one unit, which is connected by a coupling device pursuant to the invention, can be aligned in relation to the other unit at an angle deviating from 180 degrees, which allows varied applications. This is especially beneficial when to a tractor a cutter bar is attached by means of the inventive coupling device, and the area across which the cutter bar travels is offset in the travel direction laterally from the area across which the tractor travels. Also curve travel of the tractor with a work tool—and especially turning around—can beneficially be improved through length-adjustable connecting elements arranged in the lower area of the device with respect to a smaller turning radius since this way an oscillating excursion corresponding to an oscillating motion is enabled between the two units. In this arrangement each cylinder or cylinder pair is assigned a degree of freedom so that especially beneficially the full functionality of a device interface in the sense of the German Standard ISO 730 or DIN 9674 is provided even without an active control function of all length-adjustable connecting elements and/or the stabilizer element.

A length-adjustable connecting element and/or the stabilizer element could comprise a cylinder, which can preferably be selected hydraulically. This cylinder could in particular have a double-sided acting design so that such a cylinder can apply and/or transfer both pushing and towing forces. A hydraulically selectable cylinder is easy to provide for a coupling device pursuant to the invention and adapt it for example to a tractor since a tractor generally already comprises the corresponding assemblies, e.g. a hydraulic pump, lines and connecting pieces, required for other hydraulically operated actuators.

To optimize the transmission of forces, the cylinder could have a different length and a piston surface that may possibly be extended by struts. This way the different loads of the cylinder in the coupling device pursuant to the invention could be taken into account and an adaptation of the coupling device to the special requirements would be feasible.

In a particularly preferred embodiment, a length-adjustable connecting elements and/or the stabilizer element comprises a path measuring system, possibly a pressure sensor and/or a force sensor. By equipping the connecting elements with a path measuring system, a control unit that is assigned to the path measuring system will always have information about the relative position of the two units in relation to each other, which can represent a prerequisite for some applications with regard to the selection of the coupling device. If the connecting elements and/or the stabilizer element are equipped with a pressure sensor, respectively, this way dampening effects can be realized between the two units, which leads beneficially to improved driving comfort on a tractor with a work tool.

The coupling device pursuant to the invention can be used in especially varied applications if one end of a connecting element and/or one end of a stabilizer element comprises an articulated coupling, which allows a relative movement in at least two degrees of freedom. If each end of the connecting element and/or of the stabilizer element comprises such an articulated coupling, nearly unrestricted relative positioning of the two units in relation to each other will be possible. In concrete terms, the articulated coupling could comprise a universal joint.

In an especially preferred embodiment, the one unit comprises a farm or industrial vehicle. The other unit comprises a farm or industrial work tool. The vehicle could be for example in particular a tractor. The work tool could be for example a work tool that is pulled or carried by the tractor. A work tool that is pulled by the tractor is for example a plow, a work tool that is carried by the tractor can e.g. comprise a sprayer.

In another preferred embodiment, the length-adjustable connecting elements are selected such that this way a center of power acting upon the vehicle of the work tool can be changed with respect to its spatial position to the vehicle. The center of power acting upon the vehicle is in particular the intersecting point of the extensions of at least three connecting elements of the device. The three relevant connecting elements for this are the two connecting elements that are arranged in the lower area of the device and the connecting element that is arranged in a substantially central position in the upper area. As soon as one of these three connecting elements is adjusted in its length, also the intersecting point of its extension changes and hence the spatial position of the center of power, provided that these connecting elements are arranged such that their extensions result in a common intersecting point. If the equipment-side coupling plane is guided on a circular path about a center of power during excursions by controlling the length of the connecting elements, the center of power does not have to be located at the intersecting point of the extended active lines of the lower and upper connecting elements. The center of power can be selected freely with respect to its spatial position. The center of power in a configuration consisting of a tractor and a work tool is generally located between the front axle and the rear axle of the tractor.

The relative position of the center of power of the work device to the vehicle is relevant in particular for load transfer from the work tool onto the vehicle. A corresponding selection of the length-adjustable connecting elements therefore enables a shift in the center of power, and hence optimal load transfer from the vehicle onto the work tool can be accomplished.

The center of power develops when the work tool circles around a point during relative motions to the tractor. If these circular paths are changed through a corresponding selection of the length-adjustable connecting elements, then the center of power can be modified independent from the geometric design. Accordingly a spatial position change of the center of power in a substantially vertical or horizontal direction through selection of the length-adjustable connecting element can be achieved in that the one unit can oscillate freely about the center of power in the vertical or horizontal plane on a circular path, which can be varied by adjusting the length-adjustable connecting element. When both motions are superimposed, one unit oscillates freely on a spherical path about the center of power, which beneficially allows a variety of additional operating modes to be implemented.

In a preferred embodiment a floating position and/or an oscillating motion can be achieved between the two units by switching at least one individual length-adjustable connecting element into the pressureless mode. A floating position during operation exists in particular when a carried work tool adjusts its vertical movement substantially to an unevenness in the ground. An oscillating motion is possible generally only to a limited extent between the work tool and vehicle in the case of a conventional three-point tool hitch since the lower links and the upper links can perform an excursion only within a certain range, which permits an oscillating motion between the vehicle and work tool.

If now the length-adjustable stabilizer element is switched to the pressureless mode, then an oscillating motion can be realized between the two units. Switching into the pressureless mode shall be interpreted for example in the case of a hydraulic cylinder such that its piston can move freely and for this purpose the cylinder chamber can be connected with the sump.

Through a pressureless connection and/or through a connection of the piston chambers of the length-adjustable connecting elements that are provided for executing lifting motions between the two units the absorption of tongue loads and/or the torsion about the connection longitudinal axis can be realized between the two units.

Furthermore the length-adjustable connecting element that is arranged in a substantially central position in the upper area of the device can also be switched into the pressureless mode, which enables tilting between the two units. This is possible in particular when a drawn work tool is involved.

In a particularly preferred embodiment a relative position, which is adjusted to the respective operating mode of the vehicle and the work tool, of the two units in relation to each other is adjusted through the active selection of individual length-adjustable connecting elements. In the end all length-adjustable connecting elements can be actively selected to then realize a special relative positioning between the two units. This could comprise for example the lateral offset of the area across which a cutter bar travels in the travel direction from the area across which a tractor travels. Furthermore it would be possible to perform a control that is adjusted to the respective situation, where for example when turning the configuration at the end of a field the work tool does not have to be lifted and nevertheless a small turning radius can be accomplished.

It shall also be noted that due to the inventive arrangement of the length-adjustable connecting elements quite beneficially each length-adjustable connecting element is granted a degree of freedom for the relative movement between the two units. This way, by selecting a length-adjustable connecting element, a degree of freedom can be selected. It simplifies the selection of the length-adjustable connecting elements significantly, which in the end reduces the overall production costs of the coupling device pursuant to the invention.

In another embodiment an oscillating motion between the two units can be realized by coupling the two connecting elements that are arranged in the lower area of the device. Coupling here means in particular a crossed connection of the cylinder chambers, which results in opposite piston movements of the two cylinders. With such a coupling of the two connecting elements that are arranged in the lower area of the device beneficially tighter curve travel or a smaller turning radius can be achieved since the other connecting element is extended by the same amount that the one connecting element is shortened. The same principle enables the two connecting elements performing the lifting function to realize the degree of freedom about the tractor's longitudinal axis and at the same time absorb the tongue load applied by the device.

Furthermore the piston chambers of the length-adjustable connecting elements provided for the purpose of performing lifting motions between the two units can be coupled with the piston chamber of the upper connecting element that is arranged in a substantially central position. This way a front-axle load can be achieved as a function of the tongue load. Additionally the vehicle dynamics enhancing effect of this kind of arrangement is further supported by an added spring or dampening element.

The invention as well as additional benefits and beneficial developments and designs of the invention will be described and explained in more detail in the following based on the drawing showing embodiments of the invention.

Figure 2:
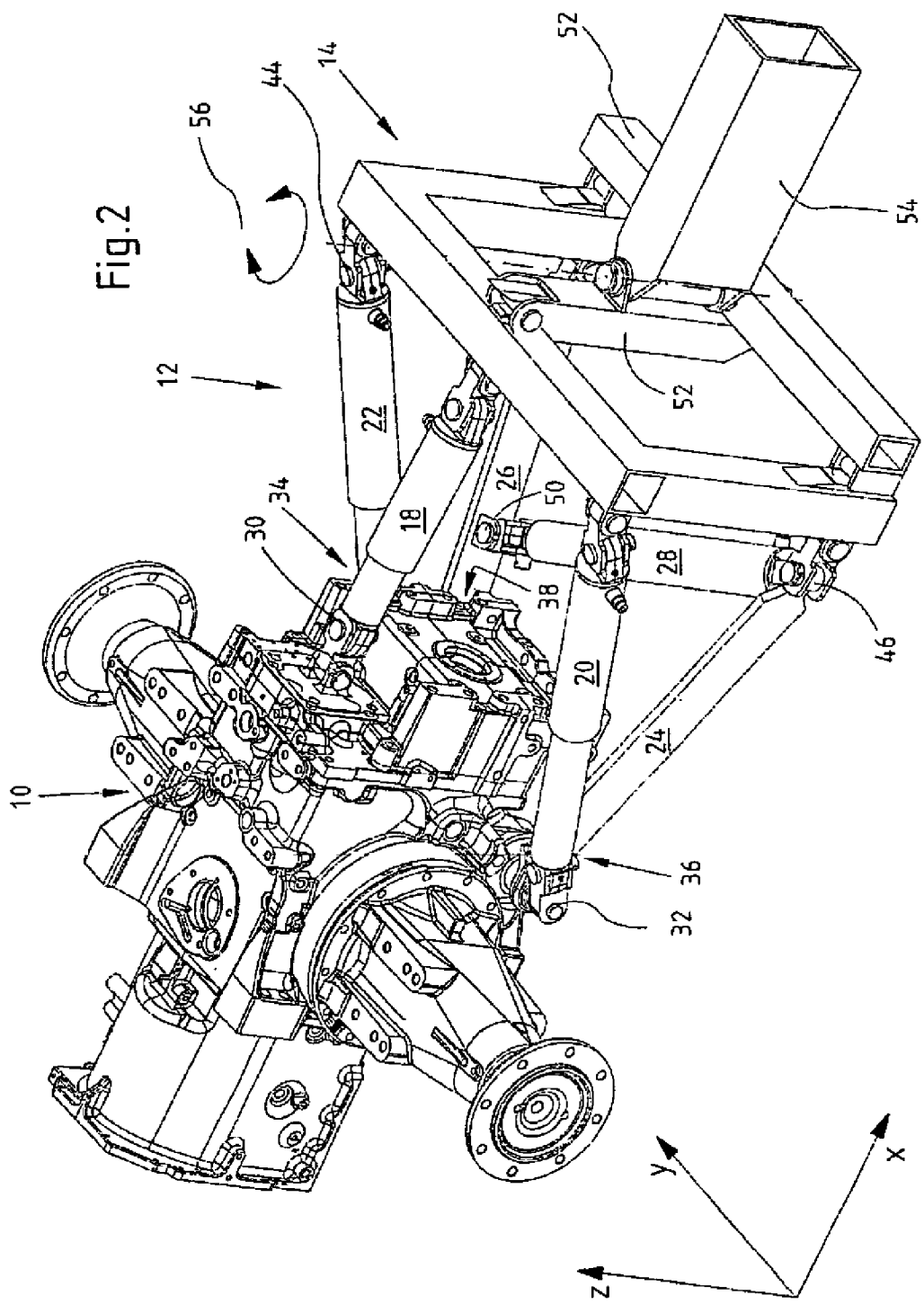
Figure 3:
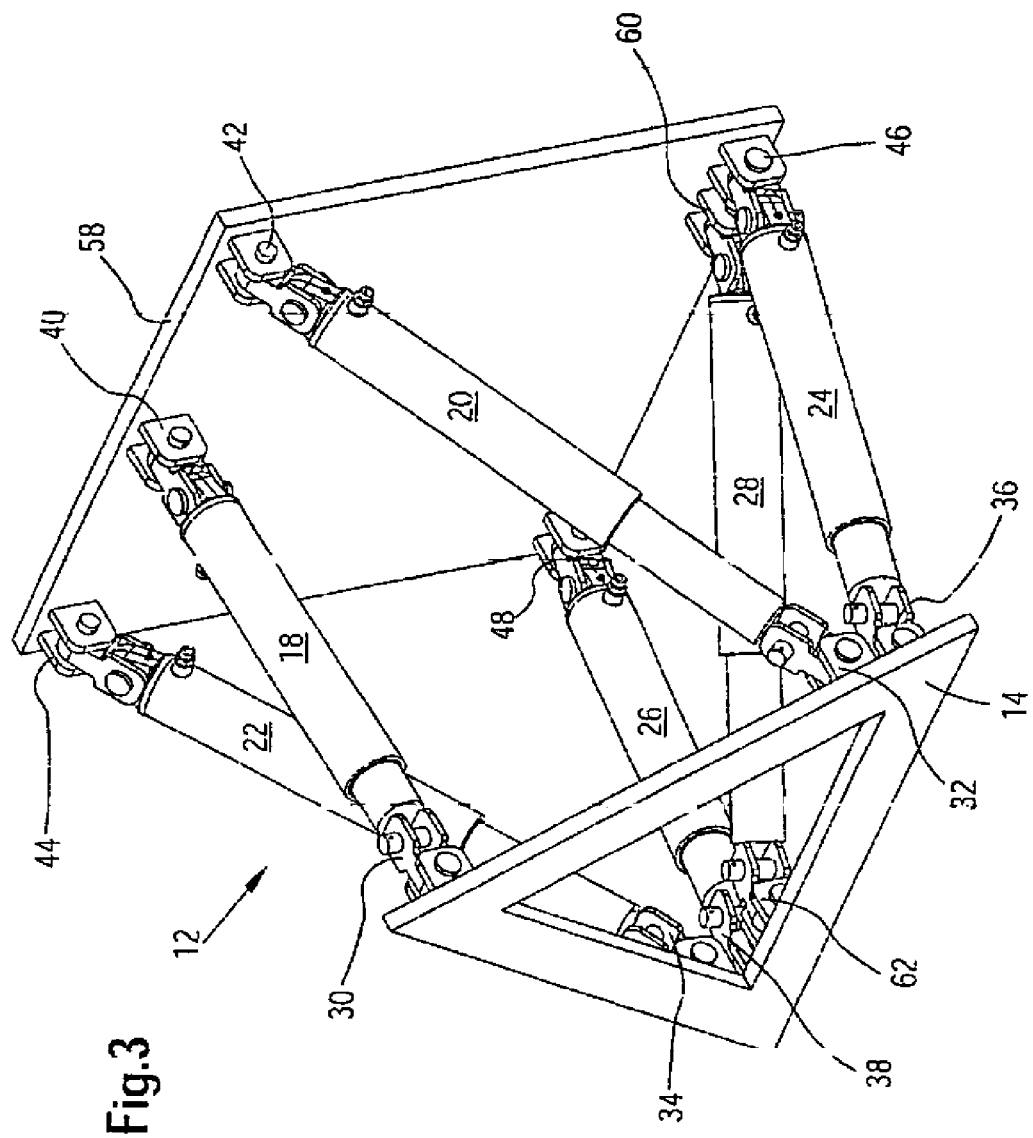
Figure 4:
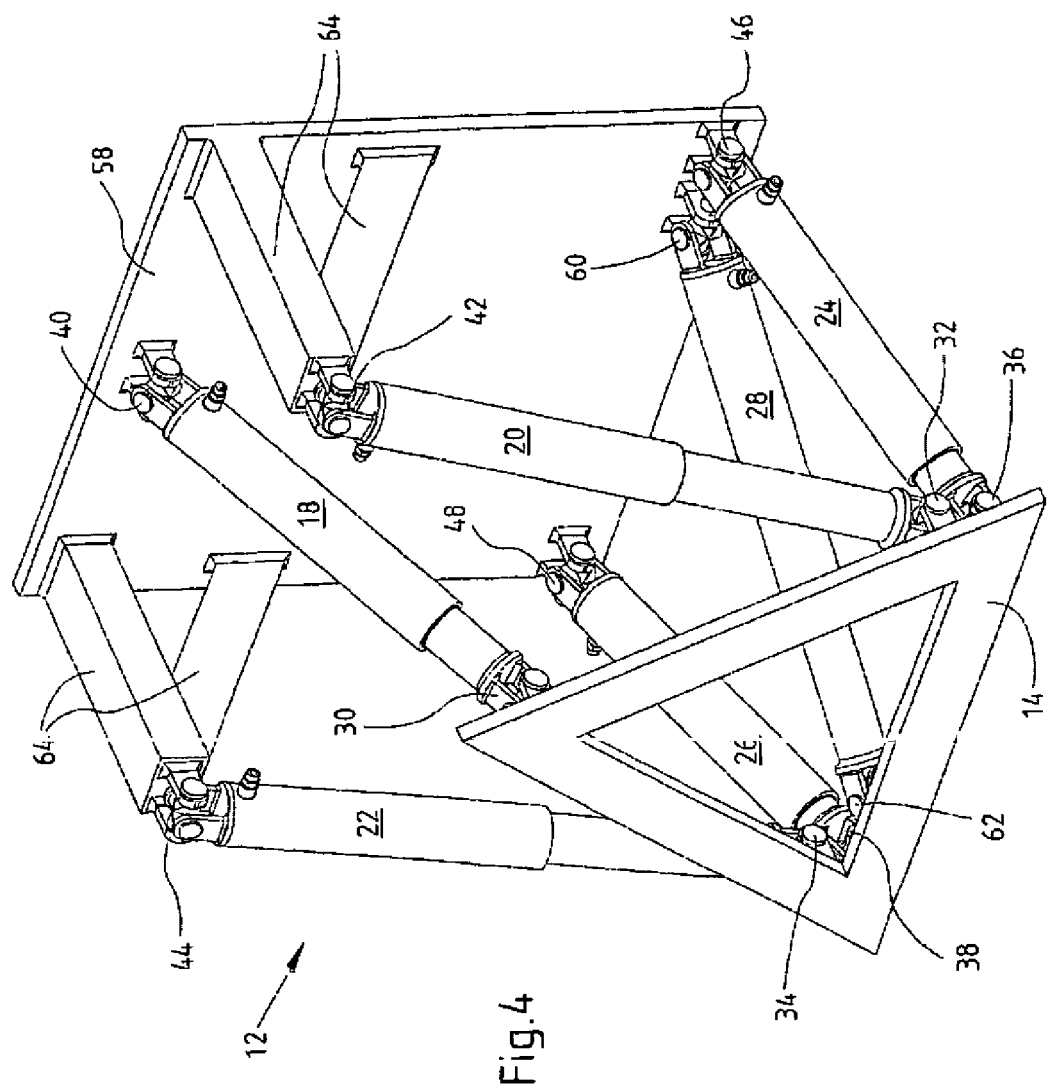
Figure 5:
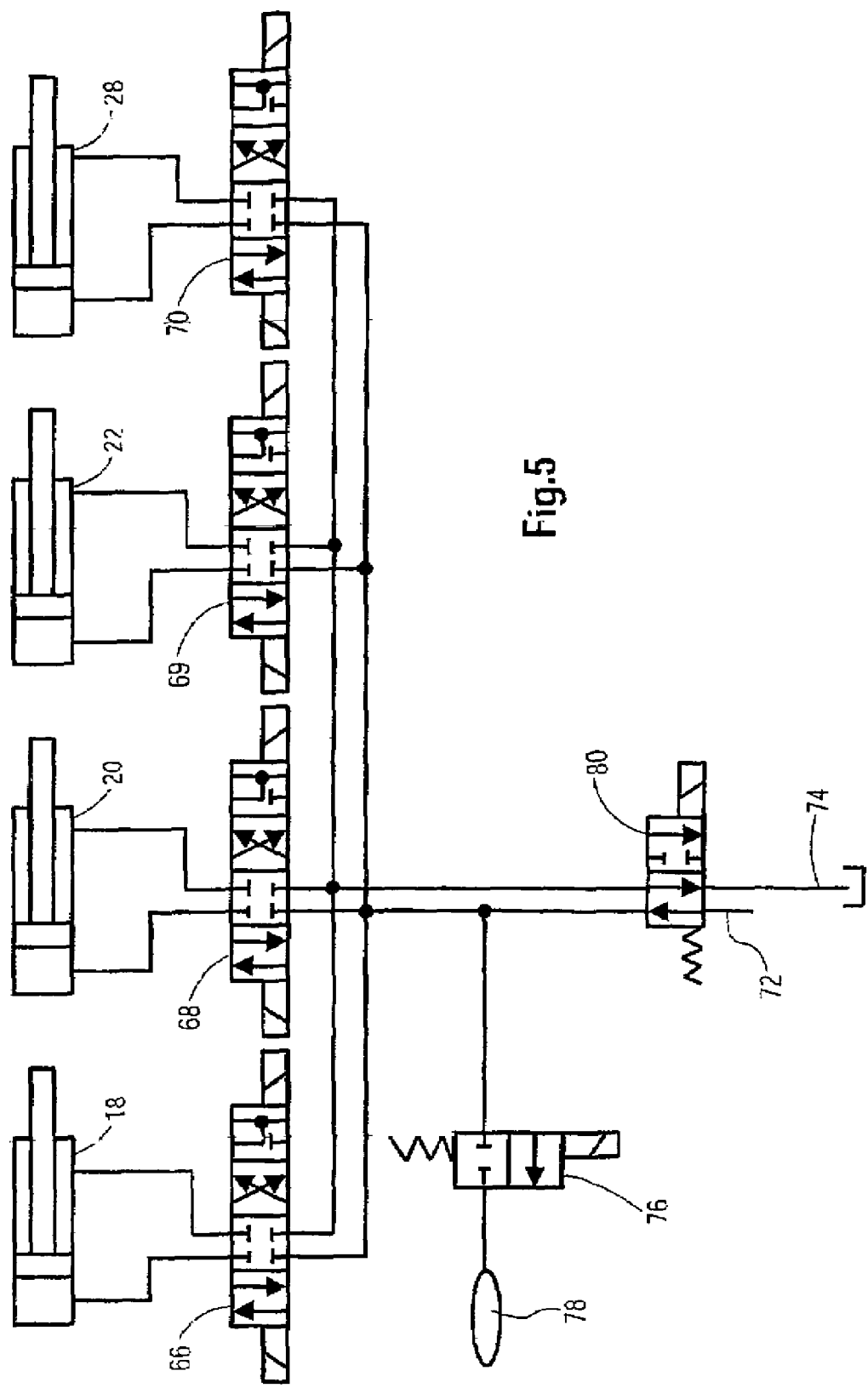
Figure 6:
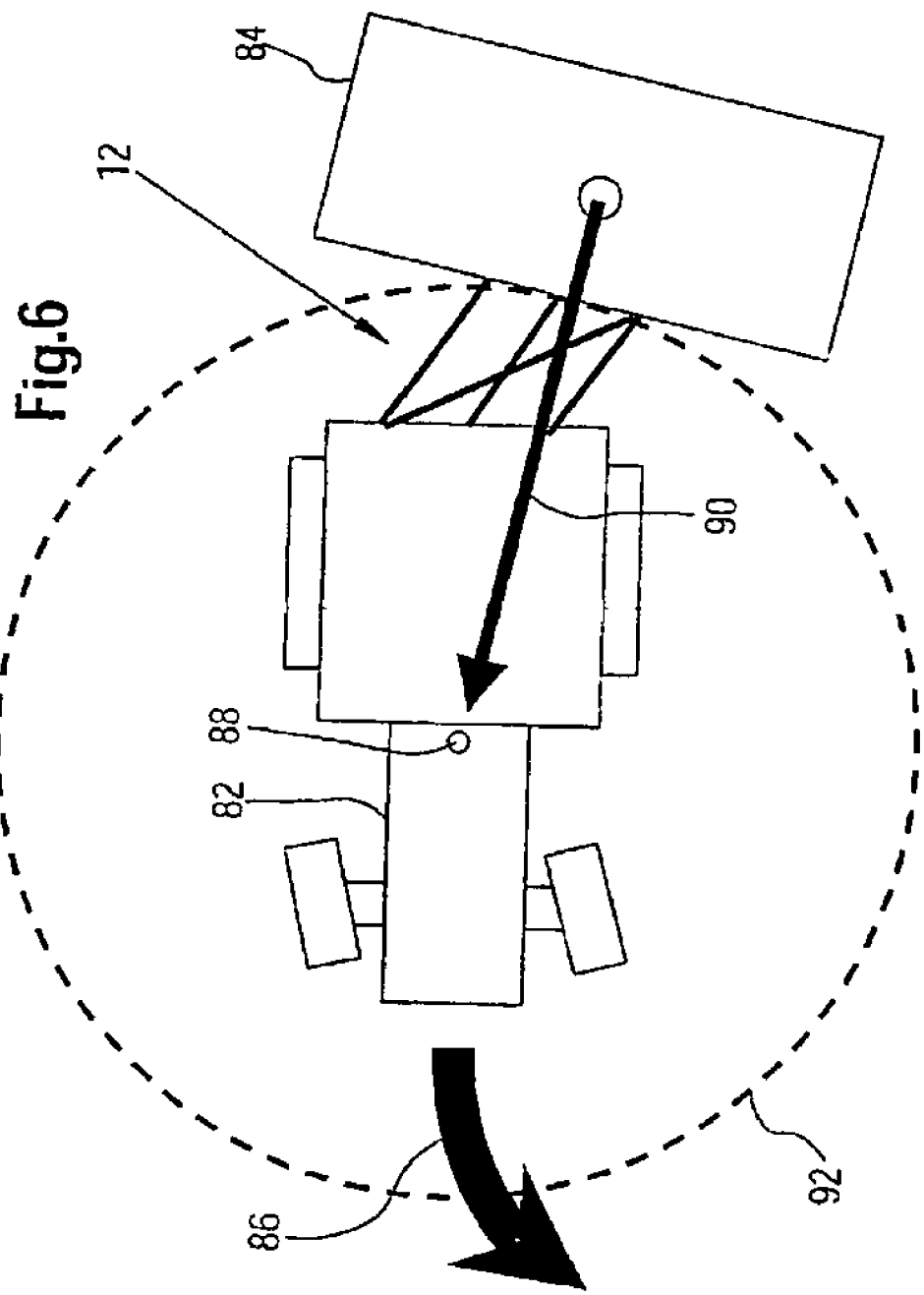
Figure 7:
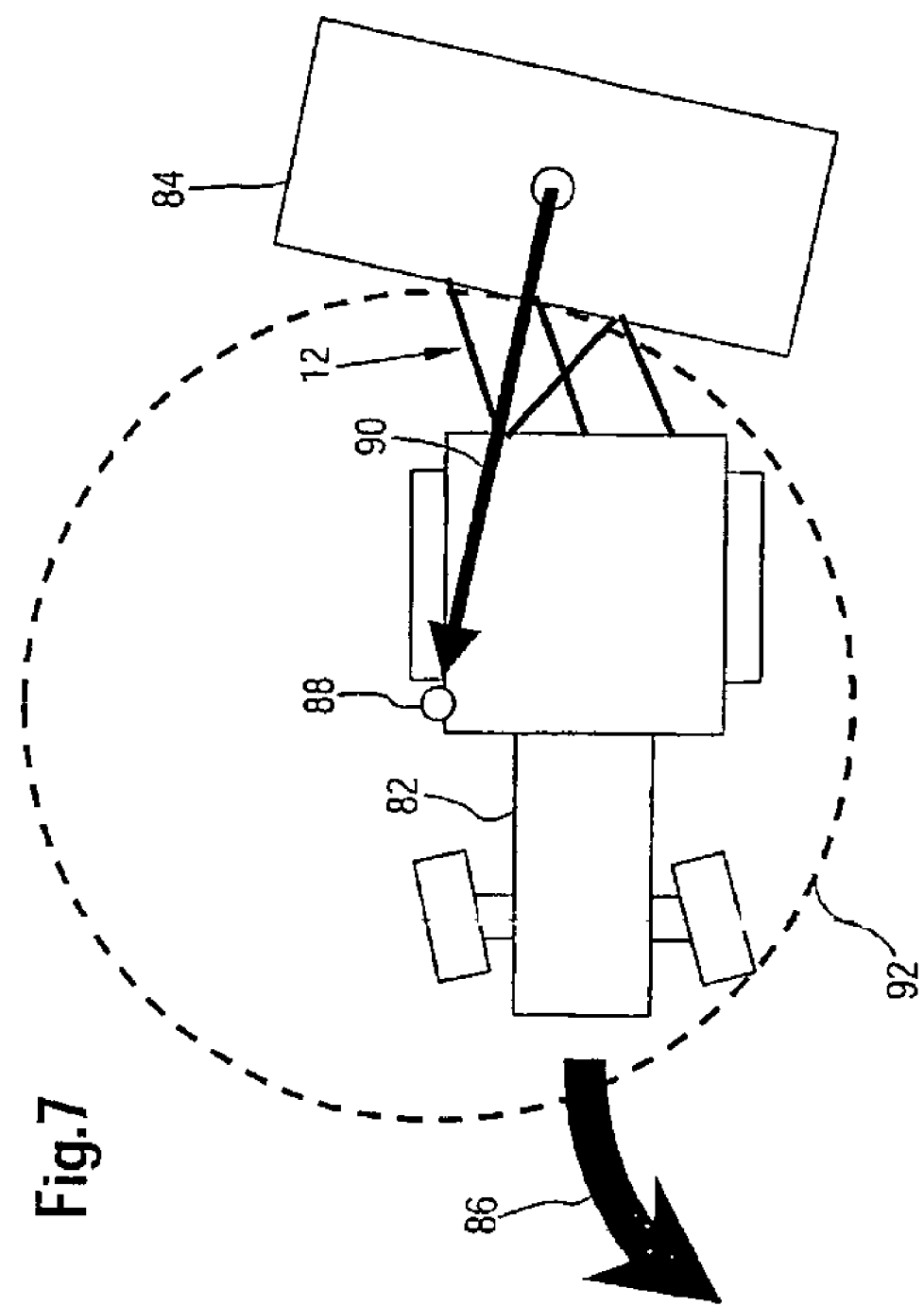
Figure 8:
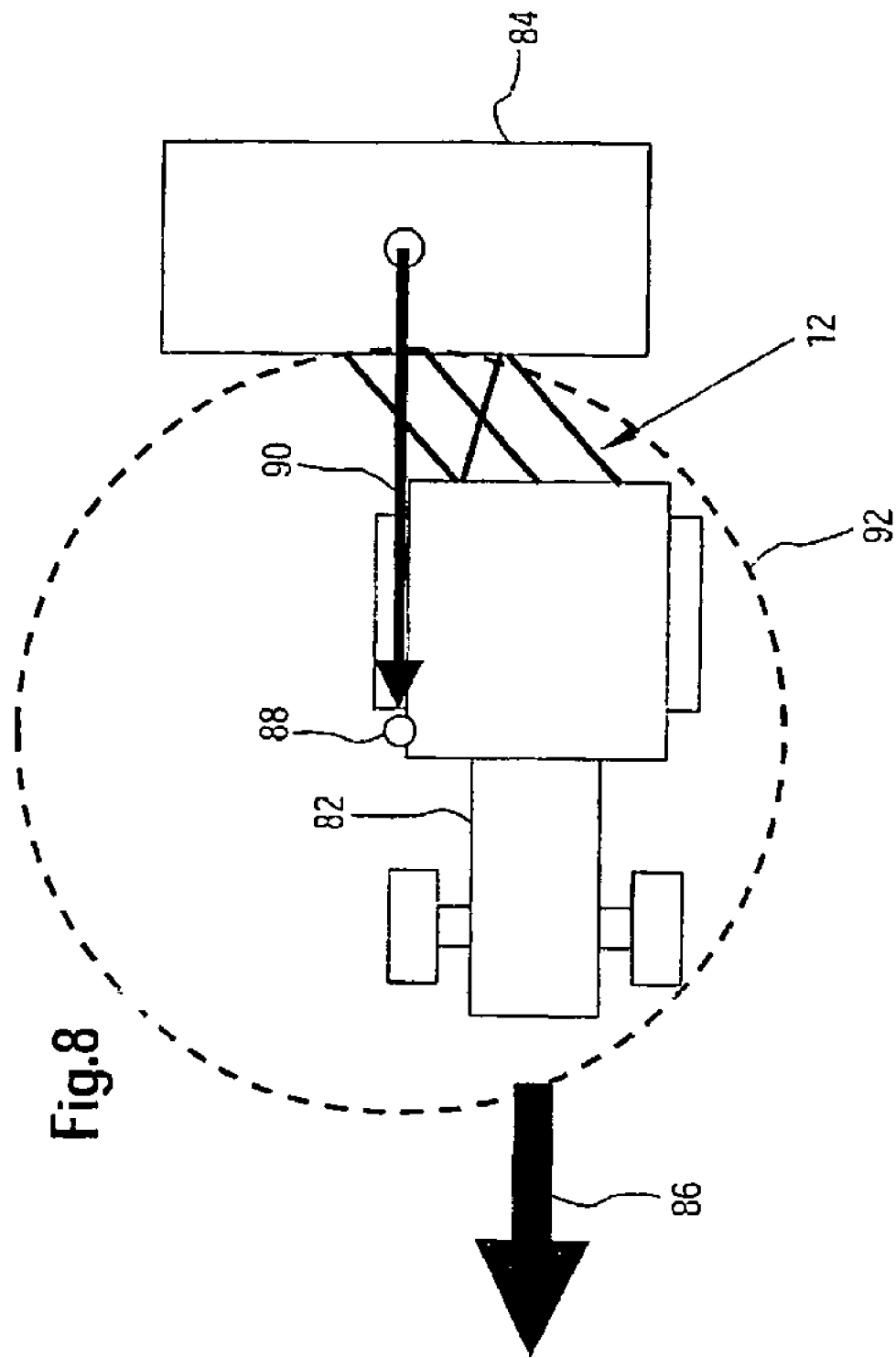
Figure 9:
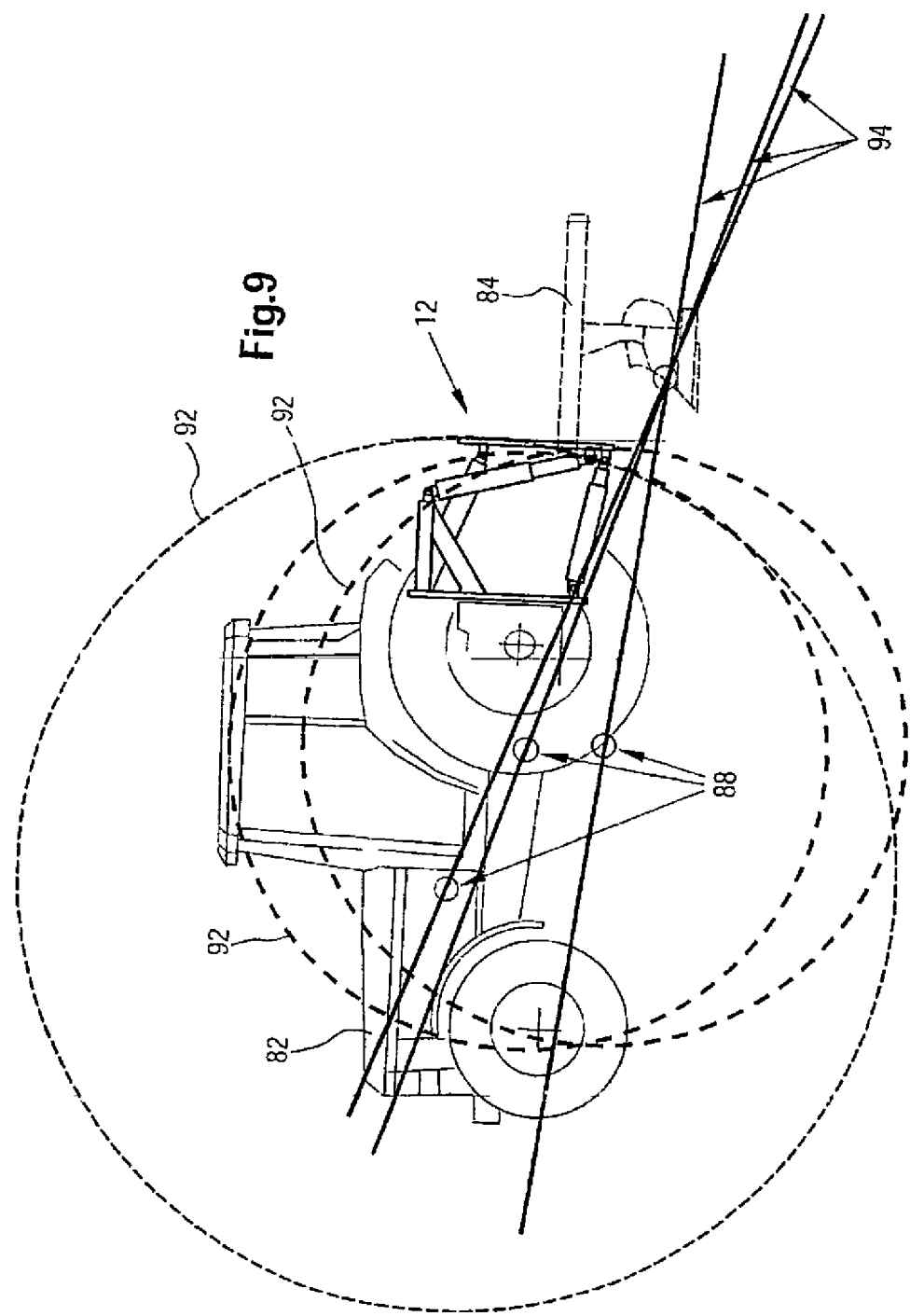

It shows:

FIG. 1 a first embodiment of the present invention in a perspective, three-dimensional view, FIG. 2 the embodiment from FIG. 1, wherein the coupling frame on the work tool side is depicted in a way that deviates from FIG. 1, FIG. 3 a second embodiment of the present invention in a perspective, three-dimensional view, FIG. 4 a third embodiment of the present invention in a perspective, three-dimensional view, FIG. 5 a diagrammatic view of a hydraulic connection diagram for selecting the four length-adjustable connecting elements of a coupling device pursuant to the invention, FIG. 6 a diagrammatic view of a work tool from above, which is coupled to a work vehicle via the coupling device pursuant to the invention, wherein the work vehicle travels in a curve, FIG. 7 a diagrammatic view of a work tool from above, which is coupled to a work vehicle via the coupling device pursuant to the invention, wherein the work vehicle travels in a curve, FIG. 8 a diagrammatic view of a work tool from above, which is coupled to a work vehicle via the coupling device pursuant to the invention, wherein the work vehicle is positioned offset laterally from the work vehicle, and FIG. 9 a diagrammatic view of a work tool from the side, which is coupled to a work vehicle via the coupling device pursuant to the invention.

In the figures the same or equivalent components have been designated with the same reference numbers. FIG. 1 shows an axle housing 10 of a work vehicle, which is not shown in further detail and which is adapted to the one coupling device 12 pursuant to the invention. The work vehicle illustrated in FIG. 1 is a tractor, which at the same time also represents a unit in the sense of patent claim 1. Via the coupling device 12 pursuant to the invention a work tool can be adapted to the tractor, wherein the work tool represents the other unit in the sense of patent claim 1. The work tool, which is likewise not shown in FIG. 1, is adapted to the coupling frame 14 via coupling devices 16 designed as hooks open towards the top. The coupling frame 14 with its coupling devices 16 ensures the three-point functionality of a conventional three-point tool hitch.

The coupling device pursuant to the invention comprises five connecting elements 18, 20, 22, 24 and 26 as well as one stabilizer element 28. The connecting elements 18, 20, 22, 24 and 26 are hingeably attached with their first ends, respectively, to the axle housing 10 of the work vehicle in a connection point 30, 32, 34, 36 and 38. With their other ends the connecting elements 18, 20, 22, 24 and 26 are hingeably attached, respectively, to a connection point 40, 42, 44, 46 and 48 to the coupling frame 14.

For the purpose of performing tilting motions between the tractor and the work tool only one length-adjustable connecting element 18 is provided, which is arranged in a substantially central position in the upper area of the coupling device 12. To transmit towing or pushing forces, two rigid connecting elements 24 and 26, which are arranged in the lower area of the coupling device 12, are provided between the tractor and the work vehicle. To perform lifting motions between the tractor and the work tool two length-adjustable connecting elements 20 and 22 are provided.

Via its connection point 32, the connecting element 20 is hingeably attached to the connection point 36 of the connecting element 24 arranged in the lower area of the coupling device 12. The connecting elements 20 and 24 therefore ideally have the same pivot point on the work vehicle side. The connecting element 20 is connected with its other end to an upper area of the coupling frame 14, namely to the connection point 42. The same applies accordingly for the connecting element 22. The connection points 32, 36 or 34, 38 are arranged close to the rear vehicle axle of the tractor, which beneficially leads to efficient load transfer between the tractor and the work tool in particular during oscillating motions about the y-axis.

To control oscillating motions between the tractor and the work tool the length-adjustable stabilizer element 28 is provided, which is connected with its one end to the coupling frame 14 in the connection point 46. With its other end it is connected to the connection point 50 in the center of the connecting element 26.

This way the inventive coupling device 12 realizes passive degrees of freedom about the y-axis indicated in FIG. 1 with the coordinate axes by accordingly selecting the length-adjustable connecting element 18 or switching it to the pressureless mode. Here tilting motions between the tractor and the work tool are involved. By appropriately selecting the connecting elements 20, 22 passive torsion of the work tool relative to the tractor about the x-axis is possible so that the coupling device 12 pursuant to the invention beneficially also provides a degree of freedom in this respect. The x-axis illustrated in FIG. 1 is arranged parallel to the longitudinal axis of the coupling device 12 and to the work vehicle longitudinal axis.

The two connecting elements 24, 26 are arranged in a convergent fashion to each other, specifically such that the ends of the connecting elements 24, 26 arranged on the tractor side are located more closely together than the ends of the connecting elements 24, 26 arranged on the coupling frame side. Accordingly the convergence point of the connecting elements 24, 26 is located approximately in the center of the tractor. The connecting elements 20, 22 are also arranged in a convergent fashion to each other so that their ends arranged on the tractor side are located more closely together than their ends arranged on the coupling frame side.

On the coupling frame 14 three connection points 40, 42 and 44 arranged on top are provided, which ideally are arranged on a line extending horizontally in the operating position. Furthermore two connection points 46 and 48 arranged on the bottom are provided on the coupling frame 14, wherein said points are likewise arranged on a horizontally extending line.

FIG. 2 shows a variation of the embodiment from FIG. 1, wherein it is indicated only diagrammatically that a work tool, which is not shown in FIG. 2, is coupled to the coupling frame 14. The work tool is a drawn trailer, wherein only the part of the work tool that is assigned to the coupling frame 14 is shown in FIG. 2. This part comprises for example a frame 52, which is engaged and fixed in the coupling devices 16 of the coupling frame 14. The end of the frame 52 on the tractor side is attached with the drawbar 54 of the trailer such that the drawbar 54 can rotate about the axis 56, wherein the axis 56 is arranged vertical or parallel to the z-axis. This way the degree of freedom of a relative movement between the tractor and the work tool about the z-axis is made available passively by the work tool. The components shown with reference numbers in FIG. 2 correspond to the components with the agreeing reference numbers in FIG. 1.

FIG. 3 shows in a diagrammatic illustration another embodiment of the coupling device 12 pursuant to the invention. Here all connecting elements 18, 20, 22, 24 and 26 as well as the stabilizer element 28 have a length-adjustable design. In this embodiment the interface to the work vehicle, which is not shown in FIG. 3, is indicated by a plate 58. The connection points 40, 42, 44, 46 and 48 of the length-adjustable connecting elements 18, 20, 22, 24 and 26 assigned to the work vehicle are all assigned to the plate 58. To the coupling frame 14 a work tool, which is likewise not illustrated in FIG. 3, can be adapted, wherein in this respect no coupling devices are shown. The stabilizer element 28 is arranged with its tractor-side connection point 60 on the plate 58 and directly adjacent to the connection point 46 of the connecting element 24. The other end of the stabilizer element 28 is arranged with its connection point 62 on the coupling frame 14 directly adjacent to the connection point 38 of the length-adjustable connecting element 26. In the embodiment shown in FIG. 3, the connection points 32, 34 of the length-adjustable connecting elements 20, 22 are arranged on the work tool side directly adjacent to the connection points 36, 38 of the length-adjustable connecting elements 24, 26. These, however, could also be located on an axis with 36, 38 and 62. The length-adjustable connecting element 28 is arranged in one plane together with the length-adjustable connecting element 24 and 26—at least in the operating state shown.

The connection points 40, 42, 44, 46, 40 [sic] and 48 of the length-adjustable connecting elements 20, 22, 24 and 26 as well as of the length-adjustable stabilizer element 28 are arranged on the plate 58, specifically substantially in a plane that is arranged horizontally in the operating position. The connection points 30, 32, 36, 34, 38 and 62 of the length-adjustable connecting elements 20, 22, 24 and 26 arranged on the work tool side as well as of the length-adjustable stabilizer element 28 are all ideally likewise arranged in a horizontal plane on the coupling frame 14 and form in essence a triangle.

FIG. 4 shows another embodiment of a coupling device 12 pursuant to the invention, which is very similar to the embodiment shown in FIG. 3. The components shown with reference numbers in FIG. 4 correspond to the components in FIG. 3 with the agreeing reference numbers. In concrete terms, only the connection points 42, 44 of the connecting elements 20, 22 are arranged at a distance from the plate 58 with the aid of frame struts 64. Since the connecting elements 20, 22 essentially serve the execution of lifting motions, the spaced arrangement of the connection points 42, 44 beneficially enables an improved load transfer onto the work tool as compared with the embodiment in FIG. 3.

The connection points 30, 32, 34, 36, 38, 40, 42, 44, 46, 48, 50, 60, 62 shown in FIG. 1 through 4 are—with the exception of connection points 36 and 34 in FIG. 1 and FIG. 2—articulated couplings, which enable a relative motion in at least two degrees of freedom. In concrete terms, such an articulated coupling is designed in the form of a universal joint. In FIG. 1 and FIG. 2 the connection points 34 and 36 have three rotatory degrees of freedom.

FIG. 5 shows in a diagrammatic illustration a hydraulic connection diagram, pursuant to which the length-adjustable connecting elements 18, 20, 22 and 28 are selected. The length-adjustable connecting elements 18, 20, 22 and 28, which correspond to the length-adjustable connecting elements illustrated in FIGS. 1 through 4, have the form of hydraulic cylinders, which have a double-sided acting design. FIG. 5 shows a rigid operating state of the length-adjustable connecting elements 18, 20, 22 and 28 since due to the indicated position of the three 4-way valves 66, 68, 69 and 70 no connection exists to the connecting elements 18, 20, 22, 28, neither to the pressure line 72 nor to the sump line 74. Also, the individual cylinder chambers of the connecting elements 18, 20, 22, 28 are separated from each other in this valve position.

The 4-way valve 66 here is assigned to the length-adjustable connecting element 18, the 4-way valve 68 to the length-adjustable connecting element 20, the 4-way valve 69 to the length-adjustable connecting element 22 and the 4-way valve 70 to the length-adjustable connecting element 28. If the first switch position from the left of a 4-way valve 66, 68, 69 or 70 is activated, the piston of the corresponding cylinder travels. Accordingly the piston of a cylinder travels back again when the third switch position from the left of a 4-way valve 66, 68, 69 or 70 is activated. If the fourth switch position from the left of a 4-way valve 66, 68, 69 or 70 is activated, then the corresponding cylinder has been switched into the pressureless state. Depending on the position of the 4-way valve 66, the one or the other chamber of the cylinder of the connecting element 18 can be connected to the accumulator 78 via the 2-way valve 76. For this purpose for example the first switch position from the left of the 4-way valve 66 and the lower switch position of the 2-way valve 76 must be activated. At the same time the 2-way valve 80 is to be activated in its right switch position. This operating mode is also possible for the other connecting elements 20, 22, 28 with a corresponding valve position of the 4-way valves 68, 69 or 70. In this operating mode the corresponding cylinder can dampen relative motions between a work tool and a tractor, which beneficially improves the driving comfort. Furthermore it is possible to switch the cylinders 18, 20 and 22 with the accumulator in a closed circuit. This beneficially results in a dampening of the tongue load and the tilting of the tractor relative to the work tool about the tractor's transverse axis. Furthermore, this position allows a load of the front axle to be dependent upon the tongue load. This leads to improved driving comfort and higher towing forces of the tractor.

FIGS. 6 and 7 show a configuration, respectively, consisting of a tractor 82 and a work tool 84, which is traveling in a curve, wherein arrow 86 indicates the driving direction. In FIG. 6 the coupling device 12 is selected such that the weight of the drawn work tool 84 acts on the tractor 82 in the center of power 88, which is indicated with the arrow 90. In FIG. 7 the coupling device 12 is selected such that the weight of the drawn work tool 84 acts on the tractor 82 in the center of power 88, which in this case is arranged laterally offset from the tractor's longitudinal axis. Here as well the direction of force is indicated with the arrow 90. By shifting the center of power 88 beneficially the driving characteristics of the configuration can be improved, especially the load transfer between the tractor and the work tool when traveling in a curve. It is feasible to support the tractor when it travels in a curve or, as shown in FIG. 7, to counteract the curve travel with a load moment to the steering moment.

FIG. 8 shows in a diagrammatic illustration a configuration consisting of a tractor 82 and a work tool 84 in straight-ahead travel. Here the coupling device 12 is selected such that the work tool 84 is laterally offset from the tractor 82 with respect to the travel direction 86 and is pulled about the center of power in a freely oscillating fashion. Such an operating mode is beneficial especially for devices that require an oscillating connection and are supposed to be guided offset from the track of the tractor.

In FIG. 6 through 8 the dotted line indicates a circle 92 about which the coupling device 12 and hence the work tool 84 can oscillate and/or swivel when individual connecting elements are adjusted with respect to their length. The circle center of the circle 92 here corresponds to the center of power 88.

FIG. 9 shows in a diagrammatic illustration a lateral view of a tractor 82, to which a work tool 84 designed in the form of a plow is adapted via a coupling device 12. Through a corresponding selection of the length-adjustable connecting elements of the coupling device 12 by modifying the circular path on which the device currently oscillates, the center of power 88 acting upon the tractor 82 can be changed in its vertical position relative to the tractor 82. Furthermore the center of power 88 can also be shifted along the tractor's longitudinal axis, which is indicated wit the center of power 88 arranged on the top left. The lines designated with the reference number 94 represent the active lines of the resulting plowing force on the tractor 82. The plow, which is coupled to the tractor 82 via the coupling device 12, can generally be controlled regarding its depth by means of the coupling device 12, although it travels in a freely oscillating fashion.

Especially beneficial is the fact that the coupling device 12 pursuant to the invention can transfer the weight of the work tool 84 onto the tractor 82 without eliminating the floating position. This way it is also possible, among other things, for the work tool 84 and the tractor 82 to rotate relative to each other about the tractor's longitudinal axis. Furthermore a convergence of the connecting elements is not required in principle in order to create an intersecting point through which the active line of the resultant force extends.

Although the invention has been described only based on an exemplary embodiment, in light of the above description as well as the drawing those skilled in the art will infer many different alternatives, modifications and variations, which are part of the present invention.

The invention claimed is:

1. A coupling mechanism for coupling an implement to a vehicle, the coupling mechanism comprising:
   a plurality of links, each having a first end pivotally coupled to the vehicle, and each having a second end pivotally coupled to the implement, the links comprising:
   an adjustable length upper link, for tilting the implement, the upper link being arranged in a substantially central position in an upper area of the mechanism;

a pair of draft links for transmitting towing and pushing forces between the implement and the vehicle, each draft link being positioned in a lower area of the mechanism; and a pair of adjustable length lift links for lifting the implement, each lift link having a first end positioned in the lower area of the mechanism and coupled to the vehicle at points adjacent to a first end of a corresponding one of the draft links, and each lift link having a second end positioned in an upper area of the mechanism and coupled to the implement; and an adjustable-length stabilizer link for controlling oscillating motions of the implement, the stabilizer link being coupled between the draft links.

2. The coupling mechanism of claim 1, wherein:
the first ends of the draft links are arranged in the lower area of the mechanism and adjacent to the first ends of the lift links.

3. The coupling mechanism of claim 1, wherein:
one end of the stabilizer link is coupled to one of the draft links, and another end of the stabilizer link is coupled to the implement.

4. The coupling mechanism of claim 1, wherein:
the links can be adjusted so that the stabilizer link and the draft links lie in a plane.

5. The coupling mechanism of claim 4, wherein:
the stabilizer link and the draft links form a closed kinematic chain.

6. The coupling mechanism of claim 4, wherein:
one end of the stabilizer link is spaced apart from the first end of one of the draft links, and another end the stabilizer link is coupled adjacent to the second end of the other draft link.

7. The coupling mechanism of claim 4, wherein:
one end of the stabilizer link is coupled adjacent to the first end of one of the draft links, and another end the stabilizer link is coupled adjacent to the second end of the other draft link.

8. The coupling mechanism of claim 1, wherein:
the draft links are arranged in a substantially convergent relation to each other.

9. The coupling mechanism of claim 1, wherein:
the first ends of the upper link and the draft links form a triangle, and the first ends of the draft links are arranged on a substantially horizontally extending axis.

10. The coupling mechanism of claim 1, wherein:
the second ends of the upper link and the lift links are arranged in a horizontal axis on an upper part of the implement, and the second ends of the of the draft links are arranged in a horizontal axis on a lower part of the implement.

11. The coupling mechanism of claim 10, wherein:
the second ends of the lift links are spaced apart from a plane defined by the second ends of upper link and the draft links.

12. The coupling mechanism of claim 1, wherein:
the links are coupled to a dismountable interface which is mounted on one of the vehicle and the implement.

13. The coupling mechanism of claim 12, wherein:
the interface comprises a coupling frame, which includes couplers for attaching a implement.

14. The coupling mechanism of claim 1, wherein:
the first ends of the links are arranged vertically plane.

15. The coupling mechanism of claim 1, wherein:
the draft links are adjustable in length.

16. The coupling mechanism of claim 1, wherein:
one of the links comprises a double acting hydraulic cylinder.

17. The coupling mechanism of claim 1, wherein:
the links are coupled to the vehicle and the implement by universal joints.

18. The coupling mechanism of claim 1, wherein:
the links comprise double acting hydraulic cylinders; and
the cylinders have a floating condition which permits an oscillating motion of the implement.

19. The coupling mechanism of claim 1, wherein:
the links comprise double acting hydraulic cylinders, each having a pair of chambers; and
a valve circuit operable to communicate both chambers of a cylinder with each other and with a hydraulic fluid reservoir and thereby place said link in a floating state.

20. The coupling mechanism of claim 19, wherein:
the implement can be tilted when the upper link is placed in the floating state.

21. The coupling mechanism of claim 20, wherein:
the length of the links can be adjusted so that axis of the links intersect at different points.

22. The coupling mechanism of claim 19, wherein:
the position of the implement is adjusted by controlling the length of the links.

23. The coupling mechanism of claim 19, wherein:
the valve circuit is operable to communicate the chambers of the lift links to the chambers of the upper link.

24. The coupling mechanism of claim 19, wherein:
the valve circuit is operable to communicate the chambers of the stabilizer link with each other and with a reservoir.

25. The coupling mechanism of claim 19, wherein:
the valve circuit is operable to cross-communicate the chambers of one of the draft links with the chambers of the other draft link.

26. The coupling mechanism of claim 1, wherein:
the lift links are arranged in a converging orientation to each other.

* * * * *